No. 771,175. PATENTED SEPT. 27, 1904.
W. C. POTTS.
VEHICLE WHEEL.
APPLICATION FILED FEB. 2, 1904.
NO MODEL. 3 SHEETS—SHEET 1.

Witnesses:
Inventor: Wm. C. Potts.
By Lane Bugger & Co., Attorneys.

No. 771,175. PATENTED SEPT. 27, 1904.
W. C. POTTS.
VEHICLE WHEEL.
APPLICATION FILED FEB. 2, 1904.
NO MODEL. 3 SHEETS—SHEET 2.
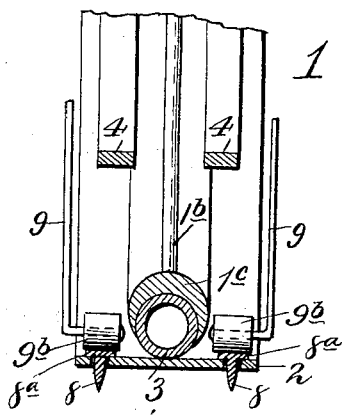
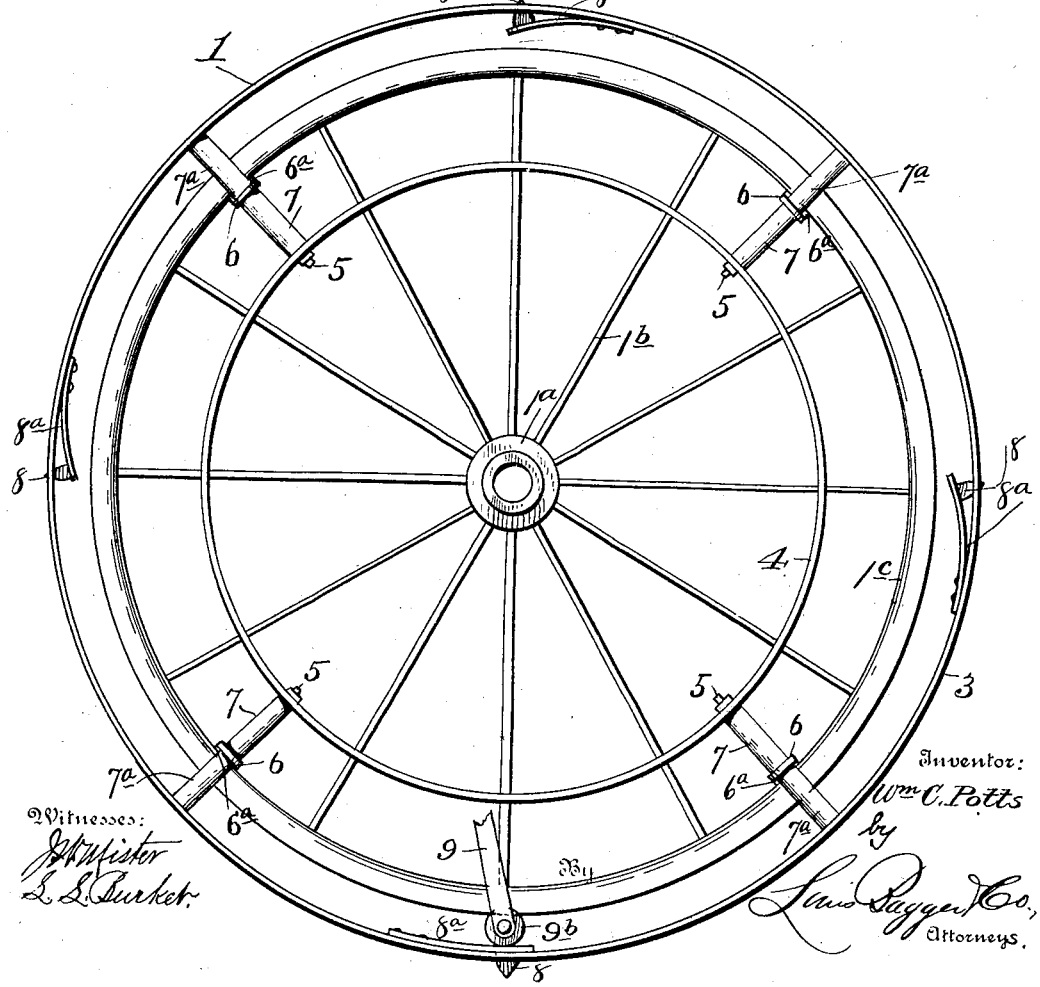

No. 771,175. PATENTED SEPT. 27, 1904.
W. C. POTTS.
VEHICLE WHEEL.
APPLICATION FILED FEB. 2, 1904.
NO MODEL. 3 SHEETS—SHEET 3.

No. 771,175.

Patented September 27, 1904.

UNITED STATES PATENT OFFICE.

WILLIAM C. POTTS, OF HARRISBURG, PENNSYLVANIA.

VEHICLE-WHEEL.

SPECIFICATION forming part of Letters Patent No. 771,175, dated September 27, 1904.

Application filed February 2, 1904. Serial No. 191,712. (No model.)

*To all whom it may concern:*

Be it known that I, WILLIAM C. POTTS, a citizen of the United States, residing at Harrisburg, in the county of Dauphin and State of Pennsylvania, have invented certain new and useful Improvements in Vehicle-Wheels, of which the following is a specification.

My invention relates to improvements in wheels for vehicles, including those of the carriage, automobile, and other type.

It has for its object to preserve the proper tread-surface of the wheel-rim as against undue or excessive flattening as it travels over the ground-surface, and yet possess or retain the requisite or desired resilient or yielding qualities of the elastic or pneumatic tired wheel. It is also noted that as the wheel-rim contacts with the usual obstructions, as stones, &c., or enters ruts, &c., in the street or roadway the concussion or jar thus produced is compensated or distributed through an extended area, and thus diverted from the wheel-axle. It is further observed that the wheel is aided, as later described, in ascending or climbing an ascent or hill in the street or roadway.

Said invention therefore consists of the combination of parts, as well as certain structural features, substantially as hereinafter more fully disclosed by the following description, and particularly pointed out by the claims concluding said description.

Figure 1:
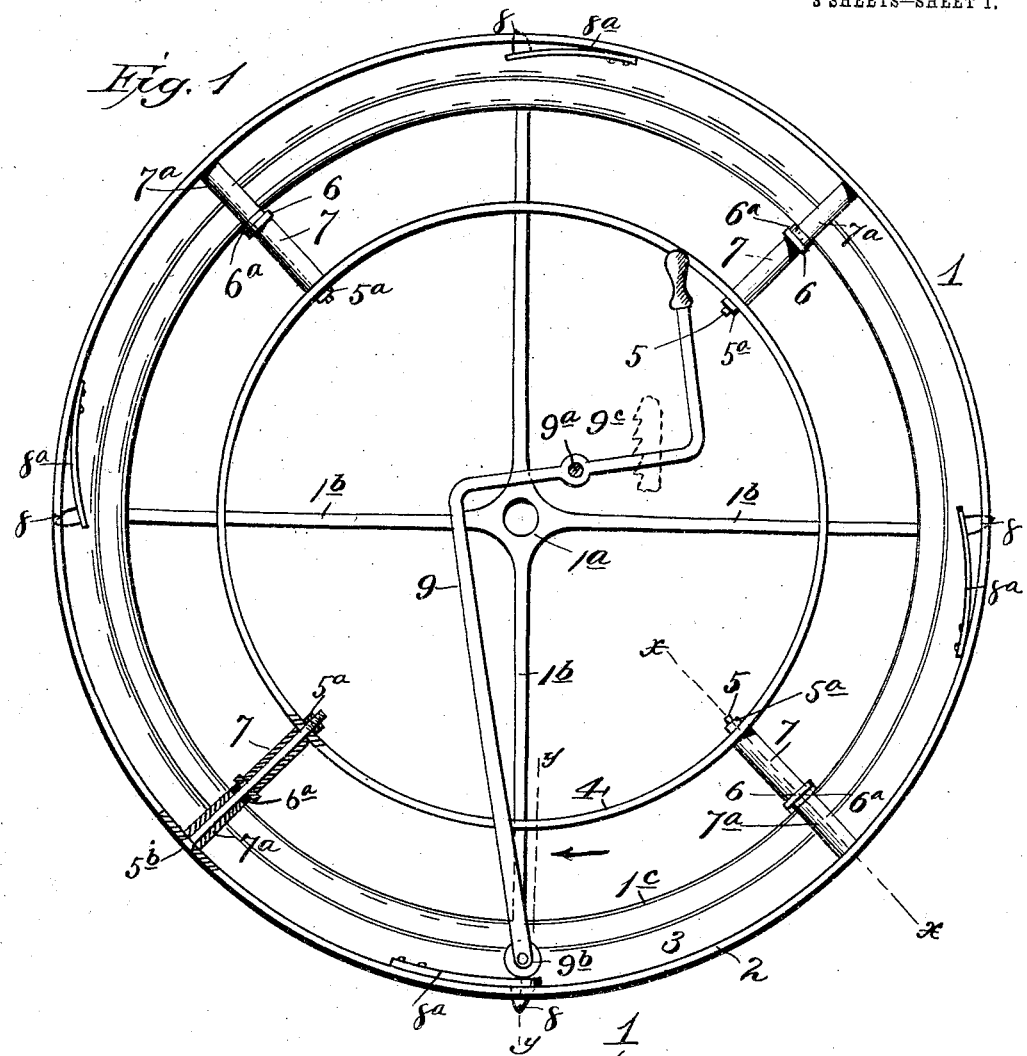
Figure 2:
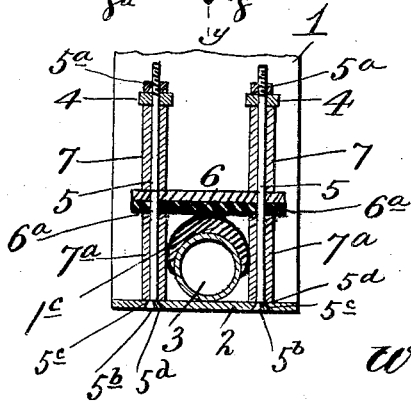
Figure 5:
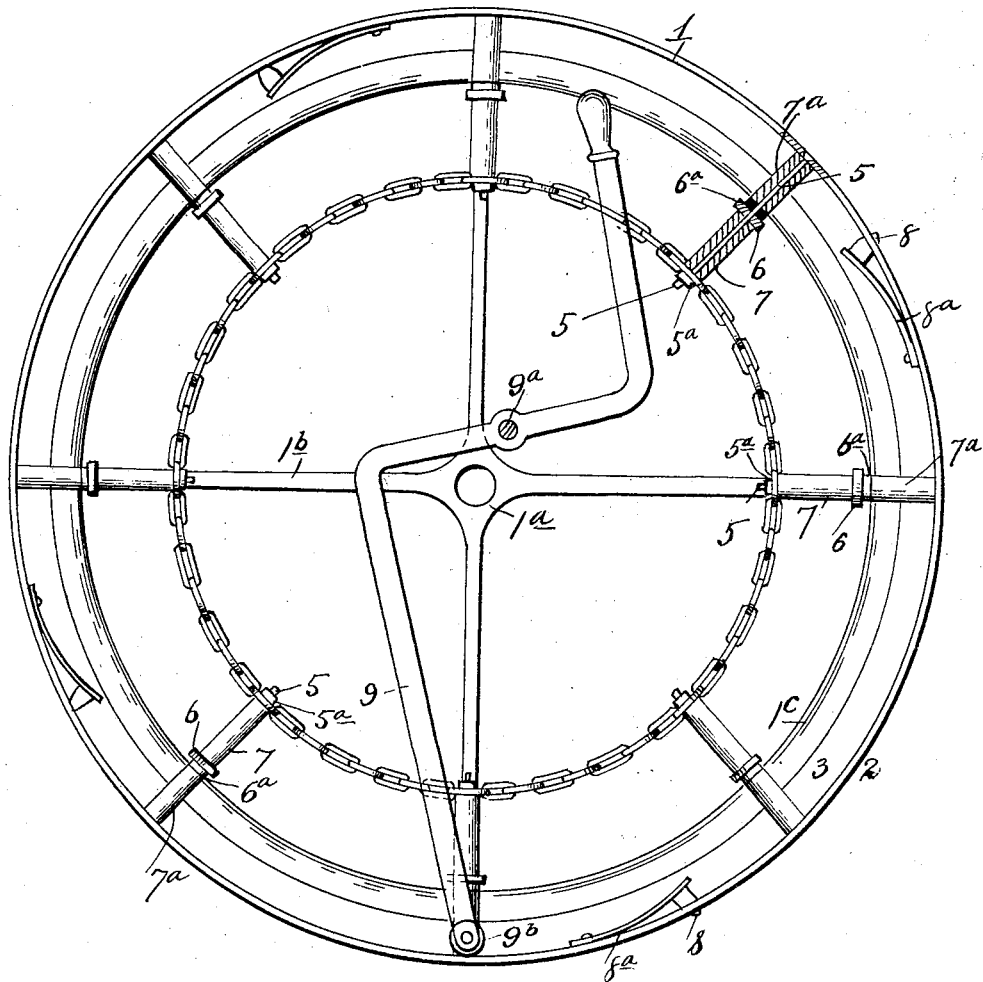

In the accompanying drawings, illustrating the preferred embodiment of my invention, Figure 1 is a side elevation of the latter, parts being broken away at the rim opposite one of the ring-member sustaining or connecting rods. Fig. 2 is a cross-section taken on the line $x\ x$ of Fig. 1. Fig. 3 is a like section produced on the line $y\ y$ of the same figure looking in the direction of the arrow. Fig. 4 is a side elevation of a modification differing from the foregoing only in omitting the pneumatic cushion. Fig. 5 is a like view of a second modification wherein the inner sustaining ring members are of link or chain formation.

In the carrying out of my invention I make the wheel proper, 1, in the usual or any approved way, the same comprising a hub $1^a$, spokes $1^b$, and felly member $1^c$. Removed some distance from the felly member $1^c$ and arranged concentrically therewith is a preferably light steel-plate tire 2, and intermediately of these is a preferably pneumatic cushion 3, suitably secured around or upon said felly member to impart to the wheel the requisite or usual resiliency attending the use of the ordinary pneumatic tire, the purposes of which are well known. Duplicate inner ring members 4 are arranged oppositely to each other and laterally of the wheel-spokes and have passing therethrough at about equal intervals or arcs apart rods 5, with their inner ends screw-threaded and provided with nuts $5^a$ to hold them to said ring members. Said rods are also passed through the tire 2 at their outer ends, said ends being suitably headed, as at $5^b$, and tapered inward from the heads, as at $5^c$, with said heads and tapered portions let into countersinks or seats $5^d$, formed in said tire, such seating or countersinking of said parts not, however, being perfectly rigid, but permitting a certain amount of mobility thereof, the object of which will be hereinafter apparent. Said rods have slipped thereon connecting or bracing plates 6, arranged inward of the felly member $1^c$ and having applied thereto, preferably, pieces of rubber or elastic material $6^a$ to form buffers between said plates and said felly member to obviate rattling or noise, as would otherwise result. Said rods also have inserted thereon metallic sleeve or tube sections 7 $7^a$, arranged intermediately of the ring members 4, the plates 6, and tire 2, thus providing for the uniform holding apart of said parts the same relative distances, which would otherwise not be the case under the flexing or yielding action of the pneumatic cushion 3. It is here noted that said cushion is sufficiently inflated to produce a readily yielding or resilient bearing for the steel tire or rim to overcome the transmission as the latter comes into contact with stones and the like or drops into ruts, &c., in the street or roadway to the wheel-axle and vehicle of a jarring action, thus rendering the latter easy running and lessening undue wear and friction. It is further observed that by the use of the steel tire and its application to the other wheel members, as above described, the flattening of the wheel tread or periphery, as would otherwise be experienced as the same travels over the ground-surface, is overcome, and yet, as intimated, the requisite resiliency is retained, whereby undue friction between the wheel and said surface is obviated, thus promoting the running capacity or speed of the wheel or vehicle.

In order to aid or wholly help the vehicle or wheel in climbing or going up an ascent or hill in the street or roadway, especially in the presence of mud or sleet, which might not otherwise be possible, I equip the tire or rim 2 upon its inner circumference, laterally of the felly member $1^c$, at suitable intervals apart, with pointed detents or teeth 8, each arranged opposite or in alinement with an aperture produced in said tire or rim and secured to one end of a preferably flat or plate spring $8^a$, the opposite end of the latter being riveted or otherwise suitably secured to the tire or rim. Said spring holds said detent or tooth in a retracted position with relation to the wheel-periphery, and to provide for bringing the teeth successively into requisition or action I provide a bent lever 9, suitably pivoted, as at $9^a$, laterally to the vehicle-body and carrying at the lower end of its vertical portion a roll or shoe $9^b$, arranged within the plane of the wheel. By suitably actuating the handle of the lever 9, held in proper position by a rack $9^c$ on said vehicle-body, the roll or shoe $9^b$ may be caused to engage and project the teeth or detents 8 successively beyond the wheel-periphery to render the same effective for the purpose stated.

In the modification as disclosed by Fig. 4 it will be seen that I may omit the pneumatic cushion, if desired, in the practice of my invention. This I do in applying said invention to light-running vehicles.

In the modification as shown in Fig. 5 I make the inner sustaining ring member 4 in chain or link form, as at 10, thus having the advantage over the solid-plate ring form above disclosed of possessing greater resiliency or elasticity to more effectively dissipate jarring or jolting from the passage of the wheel over stones in the street or roadway.

Latitude is allowed as to details herein, as they may be changed as circumstances suggest without departing from the spirit of my invention and the latter still be protected.

I claim—

1. A vehicle-wheel having a rim or tire, lateral inner ring members, fixed connections between said tire and ring members, rigid connections between said fixed connections, and yielding members interposed between said rigid connections and the felly member.

2. A vehicle-wheel having a rim or tire, lateral inner ring members, rods connected to said ring members and tire, plates or braces connecting each two opposite rods, and arranged inward of the felly member and yielding members interposed between plates and felly member.

3. A vehicle-wheel having a rim or tire, lateral inner ring members, rods connected to said inner ring members and said tire or rim and each two opposite rods linked or connected together by plates, the outer ends of said rods having heads thereon, with inward tapered surfaces, said heads and tapered surfaces entering countersinks in said rim or tire, and the linked or plate connections between said rods being effected inward of the felly member and yielding members interposed between said plates and felly member.

4. A vehicle-wheel having a rim or tire, a pneumatic cushion arranged intermediately of said tire and the felly member, lateral ring members, rods connecting said tire and felly member, each two opposite rods being linked or connected together by plates, inward of said felly member and yielding members interposed between said plates and felly member.

5. A vehicle-wheel having a rim or tire, lateral inner ring members, rods connecting said tire and ring members, plates or links connecting said rods in pairs, inward of the felly member, and tubes or sleeves arranged on said rods, intermediately of said tire, ring members and plates or links and yielding members interposed between said plates or links and felly member.

6. A vehicle-wheel having a rim or tire, lateral inner ring members, rods connecting said tire and ring members, plates or links furnished with antirattling material and connecting said rods in pairs, inward from the felly member, and tubes or sleeves arranged on said rods, intermediately of said tire, ring members and plates or links.

7. A vehicle-wheel having a rim or tire, lateral inner ring members in chain or link form, fixed connections between said tire and ring members, plate connections between said fixed connections, and yielding members interposed between said plate connections and the felly member.

In testimony whereof I have signed my name to this specification in presence of two witnesses.

WILLIAM C. POTTS.

Witnesses:
BENNETT S. JONES,
J. WM. MISTER.